US005196868A

United States Patent [19]

No et al.

[11] Patent Number: 5,196,868

[45] Date of Patent: Mar. 23, 1993

[54] IMAGE RECEIVING SHEET INVERSION SENSING TECHNIQUES

[75] Inventors: Young No, Pittsford; Stanley W. Stephenson, Spencerport; James A. Whritenor, Mendon, all of N.Y.

[73] Assignee: Eastman Kodak Company, Rochester, N.Y.

[21] Appl. No.: 874,873

[22] Filed: Apr. 28, 1992

[51] Int. Cl.$^5$ .......... G01D 15/24

[52] U.S. Cl. .......... 346/134; 346/76 PH; 400/633; 271/227; 271/232; 271/145; 271/258; 271/259

[58] Field of Search .......... 271/227, 232, 145, 258, 271/259; 400/633, 120; 346/76 PH, 134

[56] References Cited

U.S. PATENT DOCUMENTS

| | | | |
|---|---|---|---|
| 3,565,421 | 2/1971 | Barker et al. | 271/18 |
| 4,536,772 | 8/1985 | Isogai | 346/76 PH |
| 4,537,307 | 8/1985 | Tamura | 206/445 |
| 5,074,545 | 12/1991 | Handa | 271/227 |

*Primary Examiner*—Benjamin R. Fuller
*Assistant Examiner*—Huan Tran
*Attorney, Agent, or Firm*—Raymond L. Owens

[57] ABSTRACT

The present invention relates to techniques for ensuring that an image receiving sheet, which has only one major surface thereof coated with an image receiving coating, is properly oriented prior to an image being printed thereon. The image receiving sheet has a concave or convex irregularity (e.g., a notch, arc, etc.) formed in at least one nominally straight edge of the sheet. In a first embodiment, a mechanical or optical sensing means detects whether or not the image receiving sheet is stacked correctly in a loading tray by sensing whether or not the edge irregularities are properly positioned. In a second embodiment, an edge and a notch sensing means detect whether or not the image receiving sheet is oriented properly while being fed into the printer. An improperly loaded image receiving sheet is either not fed into the printer, or transits the printer without causing the printer to attempt to print the image thereon. A visual and/or audible alarm can be activated upon the detection of an improperly loaded image receiving sheet to apprise a printer operator of the improperly loaded sheet.

13 Claims, 3 Drawing Sheets

IMAGE RECEIVING SHEET INVERSION SENSING TECHNIQUES

FIELD OF THE INVENTION

The present invention relates to techniques for sensing whether or not a predetermined major surface of an image receiving sheet, which has an image receiving coating formed thereon, is correctly oriented for receiving the image in a printing process.

BACKGROUND OF THE INVENTION

In printers an image receiving sheet is used having one or both major opposing surfaces thereof which are treated or coated so as to optimally receive and reproduce a color image. These coatings on the one or both major surfaces are formed in layers using a relatively complex and expensive coating process. Because of such complex and expensive coating process, it is very advantageous to coat only one side of the image receiving sheet in order to reduce the cost of the image receiving sheets. Such cost saving is also achieved where the image receiving sheet is transparent.

In, for example, a thermal printer that can generate an image on only one side of a dye receiving sheet, it is important to properly orient the dye receiving sheet in a printing area of the printer when the dye receiving sheet has only one major surface that is coated to receive the dyes. More particularly, the one surface coated dye receiving sheet leads to problems if such dye receiving sheet is placed in the thermal printer with the non-coated side disposed to receive the dyes. Failure to properly orient the dye receiving sheet results in the color image not being reproduced. This reduces the efficiency of the printing operation.

One solution to this problem was implemented on the Kodak Model XL7700 thermal dye printer. In this printer, a series of notches is made off center on one edge of the dye receiving sheets, and labels are used (e.g., on the printer or the package of sheets) to guide a person to correctly orient the sheets while loading these sheets into the printer. This technique still allows for misprinting if the person loading the printer does not follow the labeled instructions.

U.S. Pat. No. 4,536,772 (M. Isogai), issued on Aug. 20, 1985, discloses a thermal printer which uses a notch in a dye donor sheet. The purpose of such notch is to indicate the color of the dye present within a dyesheet holder frame. More particularly, these frames are selectively fed from a holder of the frames, and the notch verifies that such frames are sequenced correctly but does not prevent misorientation of the dye donor sheets.

It is desirable to provide a technique which ensures that such image (dye) receiving sheets, which have only one side thereof with a coating formed thereon, are properly oriented when being placed in the printing area of a printer.

SUMMARY OF THE INVENTION

Viewed from one aspect, the present invention is directed to method and apparatus for sensing whether or not an image receiving sheet is properly oriented prior to an image being imposed thereon in the printing area of a printer. More particularly, the method ensures that an image receiving sheet, which has only one major surface thereof formed with an image receiving coating, is properly oriented for printing an image thereon. In a first step, an irregularity is formed along at least one nominally straight edge of the image receiving sheet at a predetermined location relative to the one major surface having the image receiving coating thereon. In a second step, a presence or an absence of the irregularity is sensed at the predetermined location prior to the image being imposed on the image receiving sheet. In a third step, the image is selectively prevented from being imposed on the image receiving sheet when the absence of the irregularity is sensed.

Viewed from another aspect, the present invention is directed to a printing apparatus wherein a separate image is to be printed on an image receiving coating formed on only one specified major surface of at least one image receiving sheet. The apparatus comprises an irregularity formed along at least one nominally straight edge of each image receiving sheet at a predetermined location relative to the one major surface having the image receiving coating thereon, sensing means, and selective means. The sensing means senses a presence or an absence of the irregularity at the predetermined location prior to the image receiving sheet having the image imposed thereon. The sensing means outputs a first output signal in response to detecting the presence of the irregularity, and outputs a second output signal in response to detecting the absence of the irregularity. The selective means selectively prints the image on the image receiving sheet in response to a first output signal from the sensing means, and prevents the image from being imposed on the image receiving sheet in response to the second output signal from the sensing means.

The invention will be better understood from the following more detailed description taken with the accompanying drawings and claims.

The drawings are not necessarily to scale.

DETAILED DESCRIPTION

Figure 1:
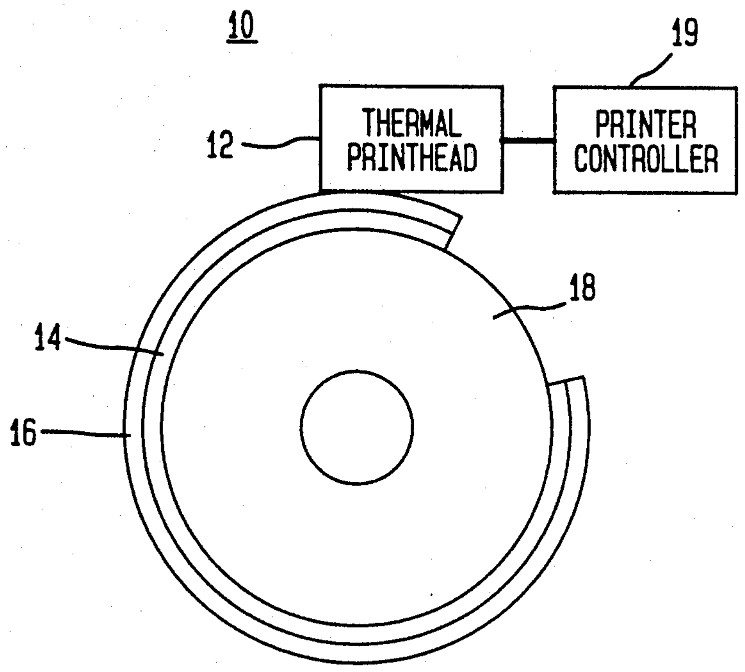
FIG. 1 (PRIOR ART)
FIG. 1 is a block diagram and side view of a platen/-printhead area of an exemplary thermal printer.
Figure 2:
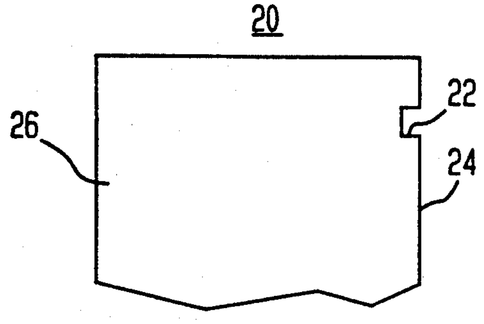
FIG. 2 is a plane view of a dye receiving sheet for use in a printer in accordance with a first embodiment of the present invention.

Referring now to FIG. 1, there is shown in block form and side view a portion of a thermal printer 10. Printer 10 comprises a printer controller 19, and a resistive element thermal head 12 which is used in forced contact with a sequence of a dye donor web or sheet 16, a dye receiving sheet 14, and a platen 18 during a printing process as is known in the prior art. The thermal head 12 comprises a plurality of resistive elements (not shown) in a line or in an array. The resistive elements are selectively energized to predetermined values during the printing process in order to cause variable quantities of the dye to be transferred from the dye donor web 16 to the dye receiving sheet 14. The selective energizing of the resistive elements of the thermal printhead 12 and the rotation of the platen 18 are each controlled by the printer controller 19. In the printing operation, the dye receiving sheet 14 and the dye donor web 16 are mounted on the platen 18 and advanced past the thermal printhead 12 in a controlled manner so that sequential lines of pixels (not shown) are generated until a complete image is generated on a major surface of the dye receiving sheet 14 contacting the dye donor web 16.

Referring now to FIGS. 2, 3, 4, and 5, there are shown plane views of various arrangements of a portion of a dye receiving sheet in accordance with separate embodiments of the present invention. Each of the dye receiving sheets has only a first major surface thereof that has a dye receiving coating formed thereon so as to optimally receive dyes from a dye donor web 16 (shown only in FIG. 1). More particularly, in FIG. 2 there is shown a plane view of an image receiving sheet 20 in accordance with a first embodiment of the present invention. The image receiving sheet 20 comprises a concave rectangular notch 22 formed in a predetermined edge 24 of the dye receiving sheet 20 relative to a first major surface 26 thereof containing the dye receiving coating. It is to be understood that the notch 22 can alternatively comprise a triangular, circular, or curved shape.

Figure 3:
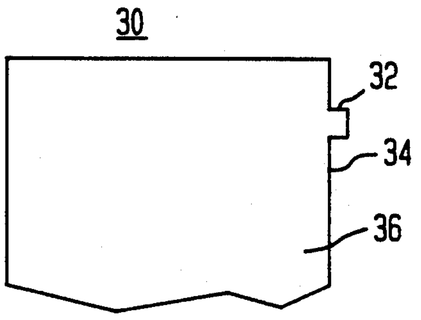
FIG. 3 is a plane view of a dye receiving sheet for use in a printer in accordance with a second embodiment of the present invention.

In FIG. 3 there is shown a plane view of an image receiving sheet 30 in accordance with a second embodiment of the present invention. The image receiving sheet 30 comprises a convex rectangular projection 32 formed in a predetermined edge 34 of the dye receiving sheet 30 relative to the first major surface 36 thereof containing the dye receiving coating. It is to be understood that the projection 32 can alternatively comprise a triangular, curved, or circular shape.

Figure 4:
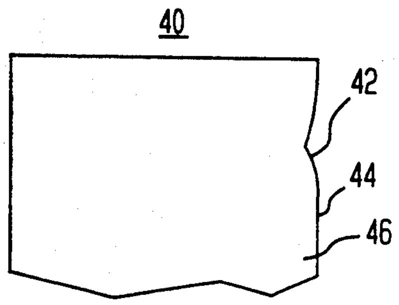
FIG. 4 is a plane view of a dye receiving sheet for use in a printer in accordance with a third embodiment of the present invention.

In FIG. 4 there is shown a plane view of an image receiving sheet 40 in accordance with a third embodiment of the present invention. The image receiving sheet 40 comprises a irregularity 42 formed in a predetermined edge 44 of the dye receiving sheet 40 relative to a first major surface 46 thereof containing the dye receiving coating. Such irregularity is in the form of a shallow dual arc but can comprise any other suitable shape.

Figure 5:
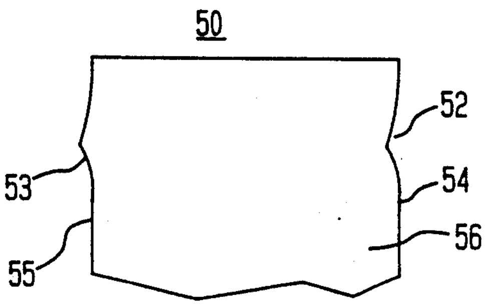
FIG. 5 is a plane view of a dye receiving sheet for use in a printer in accordance with a fourth embodiment of the present invention.

In FIG. 5 there is shown a plane view of an image receiving sheet 50 in accordance with a fourth embodiment of the present invention. The image receiving sheet 50 comprises a concave irregularity 52 (e.g., a shallow dual arc) formed a predetermined position in a first edge 54 of the dye receiving sheet 50 relative to a first major surface 56 thereof containing the dye receiving coating. A second convex irregularity 53 (e.g., a shallow dual arc which is complementary to irregularity 52) is also formed at a predetermined position in a second edge 55 which opposes the first edge 54 of the dye receiving sheet 50. Such irregularities 52 and 53 are in the form of a shallow dual arc but can comprise any other suitable shape.

It is to be understood that any suitable form of an irregularity (notch, projection, discontinuity, etc.) can be used in any predetermined location of one or more edges of a dye receiving sheet which is coated on only one major surface thereof in accordance with the present invention. More particularly, in FIGS. 2, 4, and 5, a small area of material of at least one edge of the dye receiving sheet is removed in a predetermined suitable shape. The removed material is sized to the point that a sensor (shown in FIGS. 6 and 7 discussed hereinbelow) can detect the worse case dimensional variations of the irregularity when the dye receiving sheet is disposed at a predetermined location within the printer. In FIGS. 3 and 5, the dye receiving sheet has additional material present on an edge. The dye receiving sheets shown in FIGS. 3 and 5 are more expensive because the manufacturing process has waste roughly equivalent to the material represented by an orthogonal line drawn to the farthest reach of the extension. A concave arc, or secondarily a rectangular or triangular notch, is a preferred embodiment for visual esthetics.

Figure 6:
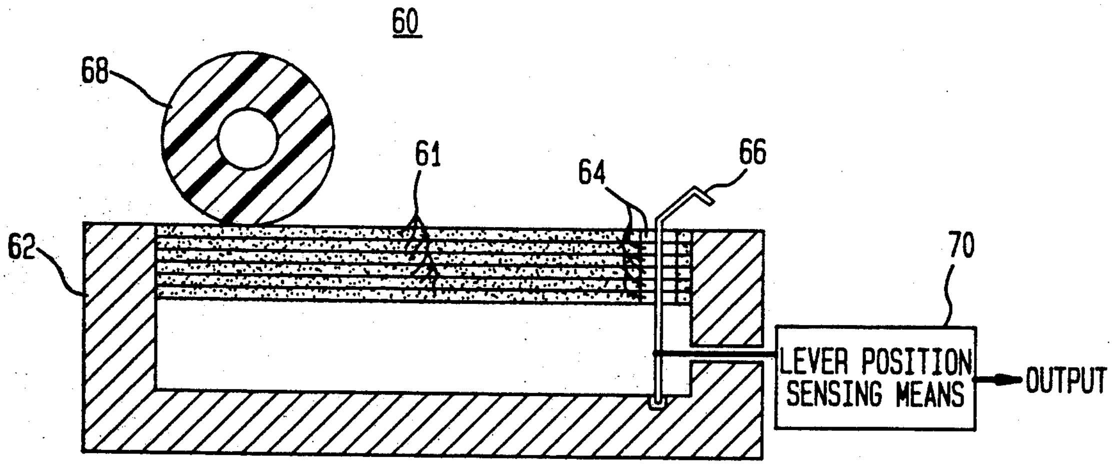
FIG. 6 is a cross-sectional side view of a loading tray associated with a thermal printer into which the dye receiving sheets of FIGS. 2, 4, or 5 are placed, the loading tray including mechanical sensing means for ensuring that the dye receiving sheets are properly oriented in the loading tray in accordance with the present invention.

Referring now to FIG. 6, there is shown a cross-sectional side view of an arrangement 60 of a loading tray 62 which is used to hold and then sequentially feed each of a plurality of dye receiving sheets 61 into the thermal printer of FIG. 1. The arrangement 60 comprises a loading tray 62, a plurality of dye receiving sheets 61 having a concave notch or arc area 64 stacked within the tray 62, a mechanical means comprising a movable lever 66 coupled to a lever position sensing means 70, and a feed roller 68.

In operation, the plurality of dye receiving sheets 61 are stacked within the loading tray 62 by an operator. The lever 66 is disposed within the tray 62 and is positioned to rest within the registration notch area 64 when the sheets 61 are correctly loaded. If even one of the dye receiving sheets 61 is misloaded, the lever 66 will not rest in the notch area 64 since the notch area 64 for that sheet will be at a position other than where the lever 66 is located. Therefore, the lever 66 will be moved outwards to engage the side of the sheet without the notch area 64. The sensing means 70 is mechanically coupled to the lever 66 to detect the orientation of the lever 66. Therefore, when the sensing means 70 detects that a sheet 61 is properly loaded because the lever 66 is resting within the notch area 64, it permits the feed roller 68 to rotate in a direction to frictionally move the top sheet 61 of the plurality of stacked sheets from the tray into the printer. When the lever 66 is not resting in the notch area 64 because of a mis-loading of one or more sheets 61, the sensing means 70 either raises an alarm or prevents the dye receiving sheet 61 from being fed into the printing mechanism of FIG. 1. In this manner, the mechanical means of lever 66 and sensing means 70 ensures that the major surface of the dye receiving sheets 61 including the dye receiving coating thereon is properly oriented in the loading tray 62 in accordance with the present invention.

Figure 7:
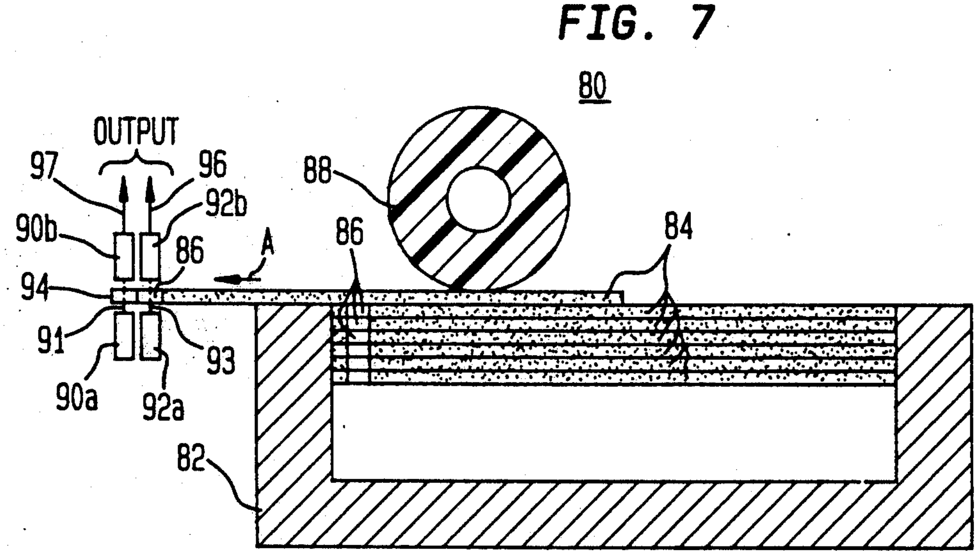
FIG. 7 is a cross-sectional side view of a loading tray associated with a thermal printer into which the dye receiving sheets of FIG. 1—4 are placed, and optical irregularity sensing means for ensuring that the dye receiving sheets are properly oriented when being fed into the printer in accordance with the present invention.

Referring now to FIG. 7, there is shown a cross-sectional side view of an arrangement 80 of a loading tray 82 which is used to hold, and then sequentially feed, each of a stack of a plurality of dye receiving sheets 84 into the thermal printer of FIG. 1 in accordance with the present invention. The arrangement 80 comprises a loading tray 82, a plurality of dye receiving sheets 84 comprising notch areas 86 which are stacked within the loading tray 82, a feed roller 88, an optical edge sensing means comprising a light source 90*a* and a light detector 90*b* with an output lead 97, and an optical notch area sensing means comprising a light source 92*a* and a light detector 92*b* with an output lead 96.

In operation, the plurality of dye receiving sheets 84 are stacked within the loading tray B2 by an operator. As each dye receiving sheet 84 is fed from the tray 82 by the feed roller 88 in the direction of the arrow A, the light detector 90*b* senses the presence of the position of a leading edge 94, and the light detector 92*b* senses the presence or absence of the nominal notch area 86 of each dye receiving sheet 84 passing thereby.

During operation, the notch area light detector 92*b* generates a first valued output signal on the lead 96 when a light beam 93 projected onto the light detector 92*b* from the light source 92*a* is not interrupted. This occurs when there is no sheet 84 passing between the light source 92*a* and the light detector 92*b*, or when the nominal concave notch area 86 is disposed in the light beam 93 of the notch area sensing means. When an edge of a sheet 84 interrupts the light beam 93 projected on the light detector 92*b* of the notch area sensing means, a second valued output signal is generated on lead 96 to indicate that a dye receiving sheet 84 is present. By itself, the notch area sensing means can be used to verify whether or not the dye receiving sheet 84 is correctly oriented by detecting the presence or absence of a concave irregularity after the light beam 93 has been interrupted a first time by a leading edge 94 of the dye receiving sheet 84 (assuming the irregularity is not at a corner of the leading edge 94 of the sheet 84).

It is preferably, however, to also include the optical edge sensing means comprising light source 90*a* and light detector 90*b* to detect a leading edge 94 of each dye receiving sheet 84. This provides a precise starting time for detecting the concave irregularity 86 within a predetermined short period of time after the leading edge 94 of the dye receiving sheet 84 is detected. More particularly, the edge sensing means transmits, for example, a first valued output signal on lead 97 when a light beam 91 from the light source 90*a* to the light detector 90*b* is interrupted, and a second valued output signal on lead 97 when the light beam 91 is not interrupted. Therefore, when both the leading edge 94 of the dye receiving sheet 84 is detected by an interruption of the light beam 91 by the light detector 90*b* of the optical edge sensing means, and a notch area 86 is shortly thereafter detected by the light detector 92*b* of the optical notch area sensing means before the light detector 90*b* detects a trailing edge of the dye receiving sheet 84, the dye receiving sheet 84 is determined as being correctly oriented. In other words, the occurrence of a combination of a first valued output signal from the light detector 90*b* of the edge sensing means and a first valued output signal from the light detector 92*b* of the notch area sensing means within a predetermined amount of time before the trailing edge of a dye receiving sheet 84 is noted indicates the correct orientation of the dye receiving sheet 84.

An additional means (not shown) within the printer 10 of FIG. 1 receives the output signals on the leads 97 and 96 from the light detectors 90*b* and 92*b*, respectively. Such additional means permits the printing of the image on the dye receiver sheet when a first output signal is transmitted concurrently by each of the light detector 90*b* of the edge sensing means and the light detector 92*b* of the notch area sensing means. However, when the leading edge of the dye receiving sheet 84 is detected by the light detector 90*b*, and a notch area 86 is not immediately thereafter detected by the light detector 92*b*, the dye receiving sheet is determined as not being properly loaded. The additional means then causes the dye receiving sheet 84 to transit the printing area without the printing of any dye thereon. Additionally, the output signals on leads 97 and 96 from the light detectors 90*b* and 92*b*, respectively, can be routed through electronic means, which can include the printer controller, to notify an operator that loads the dye receiving sheets that the thermal printer is incorrectly loaded, or has ejected a non-printed sheet 84. Alarm means (not shown) can be included which provide visual indicators (not shown) or audible signals to encourage correction of the problem by the operator.

It is to be appreciated and understood that the specific embodiments of the present invention just described are merely illustrative of the general principles of the invention. Various modifications may be made by those of ordinary skill in the art which are consistent with the principles set forth. For example, an optical notch area sensing means, as described for the notch area sensing means 92 of FIG. 7, can be substituted for the combination of the mechanical means 66 and sensing means 70 shown in FIG. 6 in the nominal notch area in the loading tray 62.

What is claimed is:

1. A method of ensuring that an image receiving sheet having only one major surface thereof formed with an image receiving coating is properly oriented for printing an image thereon comprising the steps of:

(a) forming an irregularity along at least one nominally straight edge of the image receiving sheet at a predetermined location relative to the one major surface having the image receiving coating thereon;

(b) sensing a presence or an absence of the irregularity at the predetermined location prior to the image being imposed on the image receiving sheet; and (c) selectively preventing the image from being imposed on the image receiving sheet when the absence of the irregularity is sensed.

2. The method of claim 1 wherein, in performing step (a), the irregularity is selected from a group consisting of a concave notch, a concave arc, or a concave discontinuity.

3. The method of claim 1 wherein in performing step (b), using a mechanical sensing means to detect the presence or absence of the irregularity at the predetermined location along at least one edge of the image receiving sheet.

4. The method of claim 1 wherein in performing step (b), using an optical sensing means to detect the presence or absence of the irregularity at the predetermined location along at least one edge of the image receiving sheet.

5. The method of claim 4 wherein in performing step (b), disposing the optical sensing means in a feed path prior to the image receiving sheet reaching a printing area where an image is to be imposed on the image receiving sheet.

6. A printing apparatus wherein a separate image is to be printed on an image receiving coating formed on only one specified major surface of an image receiving sheet, the printing apparatus comprising:

an irregularity formed long at least one nominally straight edge of the image receiving sheet at a predetermined location relative to the one majOr surface having the image receiving coating thereon;

sensing means for sensing a presence or an absence of the irregularity at the predetermined location prior to the image receiving sheet having the image imposed thereon, and for outputting a first valued output signal in response to detecting the presence of the irregularity and for outputting a second valued output signal in response to detecting the absence of the irregularity; and selective means for selectively printing the image on the image receiving sheet in response to the first valued output signal from the sensing means, and for preventing the image from being imposed on the image receiving sheet in response to the second valued output signal from the sensing means.

7. The printing apparatus of claim 6 wherein the irregularity is selected from a group consisting of a concave notch, a concave arc, or a concave discontinuity.

8. The printing apparatus of claim 6 wherein the sensing means is a mechanical means for generating the first or second valued output signal in response to the sensing of presence or absence, respectively, of the irregularity at the predetermined location along the at least one edge of the image receiving sheet.

9. The printing apparatus of claim 8 wherein the mechanical means comprises:

a movable lever that assumes a first position which engages the irregularity of the image receiving sheet when the sheet is properly loaded in the loading tray, and assumes a second position which engages an edge of the image receiving sheet when the image receiving sheet is improperly loaded in the loading tray; and signaling means coupled to the movable lever for generating the first valued output signal in response to the movable lever assuming the first position, and for generating the second valued output signal in response to the movable lever assuming the second position.

10. The printing apparatus of claim 6 wherein the sensing means is an optical sensing means for generating the first or second valued output signal in response to the sensing of presence or absence, respectively, of the irregularity at the predetermined location along the at least one edge of the image receiving sheet.

11. The printing apparatus of claim 10 wherein the optical sensing means comprises a first optical sensor disposed to receive light projected through the irregularity of an image receiving sheet when the image receiving sheet is properly loaded in a loading tray for generating the first valued output signal, and for generating the second valued output signal when the light is obstructed by the image receiving sheet being improperly loaded in the loading tray.

12. The printing apparatus of claim 10 wherein the optical sensing means comprises a first optical sensor disposed (a) in a feed path prior to the image receiving sheet reaching a printing area where an image is imposed on the image receiving sheet, and (b) in a position to receive a light beam projected through the irregularity of an image receiving sheet when the sheet is properly oriented in the feed path for generating the first valued output signal when the irregularity moves adjacent the first optical sensor, and for generating the second valued output signal when the light beam is obstructed by the image receiving sheet moving adjacent the first optical sensor in the absence of the irregularaly.

13. The printing apparatus of claim 12 wherein the optical sensing means further comprises a second optical sensor disposed in the feed path for generating the first valued output signal when a leading edge of the image receiving sheet passes thereby, whereby the combination of the first valued output signal from each of the first and second optical sensors indicates that the image receiving sheet is properly oriented.

* * * * *